A. E. COOK & T. VAN TUYL.
OPPOSED CONVERTIBLE INTERNAL COMBUSTION ENGINE.
APPLICATION FILED SEPT. 3, 1912.

1,213,841.

Patented Jan. 30, 1917.
6 SHEETS—SHEET 3.

UNITED STATES PATENT OFFICE.

ALBERT E. COOK, OF ODEBOLT, IOWA, AND THOMAS VAN TUYL, OF KANKAKEE, ILLINOIS; SAID VAN TUYL ASSIGNOR TO SAID COOK.

OPPOSED CONVERTIBLE INTERNAL-COMBUSTION ENGINE.

1,213,841.          Specification of Letters Patent.          Patented Jan. 30, 1917.

Application filed September 3, 1912. Serial No. 718,180.

*To all whom it may concern:*

Be it known that we, ALBERT E. COOK and THOMAS VAN TUYL, citizens of the United States, and residents of the city of Odebolt, in the county of Sac and State of Iowa, and Kankakee, Kankakee county, Illinois, respectively, have invented certain new and useful Improvements in Opposed Convertible Internal-Combustion Engines; and we do hereby declare that the following is a full, clear, and exact description of the same, reference being had to the accompanying drawings, and to the numbers of reference marked thereon, which form a part of this specification.

Heretofore engines, practically of all kinds, have been so constructed as to deliver their power from a single driving element or shaft, thereby to some extent, limiting the adaptability of such engines for certain uses, for example, in confined spaces, and where the power may be required for driving numerous more or less unrelated elements or devices. Internal combustion engines also have heretofore been so constructed as to operate either on the two stroke or two cycle, or the four stroke or four cycle plan, in some instances the two stroke operation being more satisfactory, and in others, the four stroke. No means have heretofore been provided for quickly changing the operation of an engine from a two to a four stroke type.

The object of this invention is to afford a construction having a plurality of driven elements, from any of which the entire power of the engine may be delivered or from each of which the power may be delivered to drive either independent or related mechanisms.

It is a further object of the invention to afford a construction in which four driving pulleys or elements are provided, any or all of which may be utilized in delivering the power developed by the engine.

It is also an object of the invention to so construct an engine having opposed cylinders and of the central compression central fire type, as to admit of converting the engine from the two stroke to a four stroke operation or vice versa without the necessity of stopping the engine.

It is also an object of the invention to afford a construction of a distinctively two stroke type, and equipped with mechanism for converting the same, without stopping, to a four stroke type, and when so operating, to afford prior to ignition, an additional supply of fuel mixture in the combustion chamber over that afforded by the normal two stroke operation.

Other objects of the invention will hereinafter more fully appear.

The invention (in a preferred form) is illustrated in the drawings, and hereinafter more fully described.

In the drawings: Fig. 3 is an enlarged section on line 3 of Fig. 2.

As shown in the drawings: A plurality of parallel cylinders indicated by 1, 2, 3, and 4, (though, of course, the number of cylinders may be one or more as preferred) are rigidly secured together in parallel relation side by side, and in each of said cylinders are two oppositely disposed pistons 5, 6, 7, and 8, which are connected by means of connecting rods 9, 10, 11 and 12, with independent crank shafts 13 and 14, at opposite ends of the machine or engine. On each end of each of said crank shafts, is a driving pulley A, B, C, and D, which may be of any desired size, and serve as balance wheels, and may be utilized as friction driving pulleys for driving mechanism independently or simultaneously, or, of course, if desired, may be utilized as belt wheels or geared or in any manner constructed to deliver the power of the engine to mechanism. Each of said crank shafts has rigidly secured thereon a pinion 15, and 16, respectively, and intermeshing said pinions and each other, and journaled upon shafts 17 and 18, secured at the side of the engine, are gear wheels 19 and 20, whereby the rotation of said shafts are synchronous, and enabling the full power of the engine to be delivered from any one of the driving elements A, B, C, or D, or collectively from A, B, C, and D, or any number thereof, as preferred. As shown, said train of gears is inclosed in a case comprising at the inner side the outer jacket wall of the cylinder 4, and at the outer, an outer wall 21, therefor, and a removable cover 22, is provided for said train which is secured by means of cap screws or in any suitable manner to afford access to said gear case, when desired.

Figure 3:
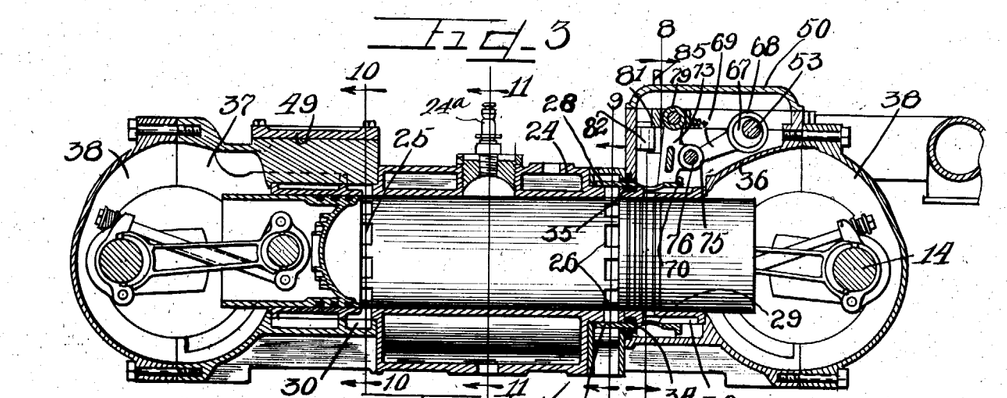
Figure 7:
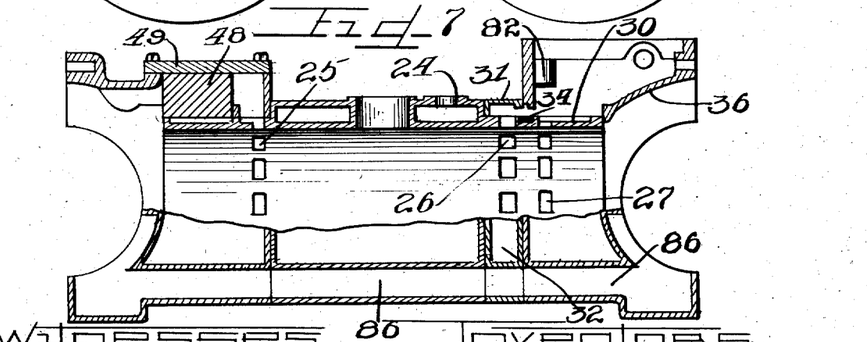
Fig. 7 is a view partly in section and broken away, of one of the cylinders showing the same disconnected from the rest of the engine.
Figures 8, 9:
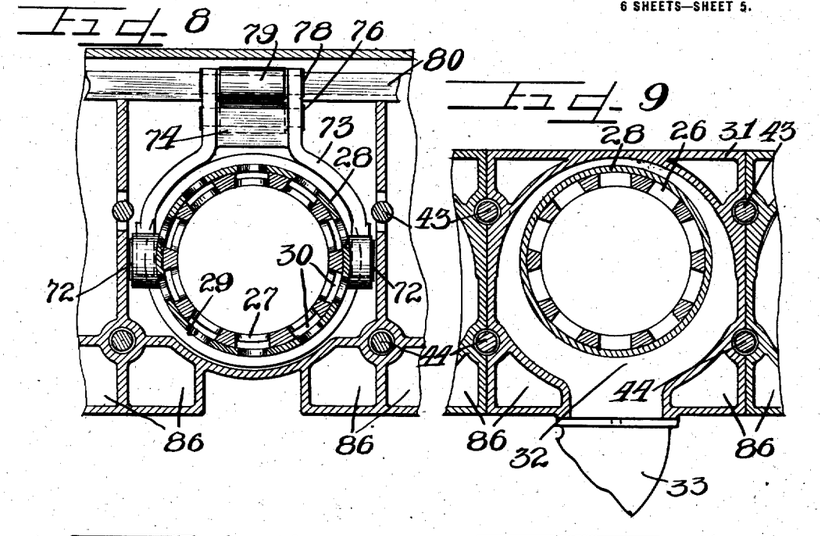
Fig. 8 is an enlarged section taken on line 8 of Fig. 3.
Fig. 9 is an enlarged section taken on line 9 of Fig. 3.
Figure 11:
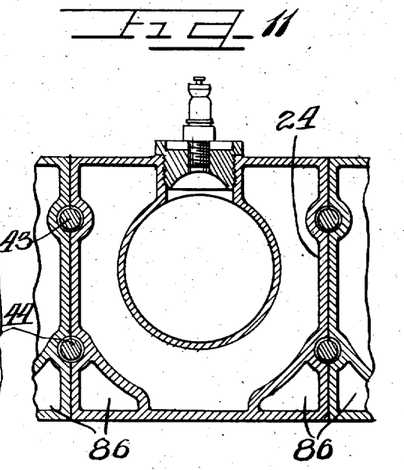
Fig. 11 is an enlarged section taken on line 11 of Fig. 3.

Said engine is constructed to permit of being knocked down or disassembled into small units, and to permit of quick assembling to enable any part thereof to be renewed at slight expenditure of time and trouble. Surrounding each of said cylinders at its middle part, and inclosing all that portion thereof subjected to heat, is an integral casing 24, as shown in Fig. 11, subtantially rectangular in cross section and affording an interior chamber for water jacketing, or the use of any cooling fluid. Threaded through said casing 24, and projecting into a recess in each of the cylinders are igniters 24ª, of any suitable type, preferably electric. Beyond the ends of said casing 24, the cylinder is turned at each end to cylindric form concentric with its axis, and at one end thereof and positioned to be uncovered at the limit of the outward stroke of the pistons are peripherally arranged inlet ports 25. Near the other end of said cylinder at a position to be uncovered at the limit of the outward stroke of the complemental piston, are peripherally arranged outlet or exhaust ports 26, and beyond the same or nearer the extremity of said end of the cylinder are peripherally arranged inlet ports 27, through which the mixture is admitted to the crank cases for primary compression. Slidably mounted on said end of the cylinder and acting to control the exhaust ports for four cycle operation, is a sleeve valve 28, which is provided with apertures or ports 29, therethrough near its outer end, which at all times open into an elongated peripheral passage 30, afforded between the outer wall of the cylinder and the inner wall of said sleeve, as shown in Figs. 3, 7, and 8. Secured around said end of the cylinder to register with the exhaust ports 26, when said valve sleeve is retracted, is an annular fitting or casing 31, which fits closely to the walls of the cylinder and is provided with an interior peripheral channel or chamber 32, to receive the exhaust and is provided, as shown at the bottom, with an opening therethrough to afford attachment for the exhaust manifold 33. As shown, a packing recess is provided around said cylinder between the exhaust ports 26, and the ports 27, inletting to the crank case, and a packing ring 34, is provided therein, over which the valve sleeve slides, as shown in Fig. 3, and a corresponding packing ring 35, is provided on the outer side of said valve sleeve and against said exhaust casing 31, to prevent leakage either of the fuel mixture or of the gases of combustion around said valve sleeve.

The ends of the cylinders are all rigidly secured in the inner sections of the crank case 36 and 37, which are cast integral for all said cylinders and serve to rigidly engage the same together side by side or transversely the cylinders. Said inner crank case section 36, or that for the exhaust end of the cylinder, is cored to receive the end of said cylinder therein and to afford a passage around said valve sleeve, and to fit to the packing ring 35, and to bear the same firmly against the exhaust casing 31, as shown in Fig. 3, and rigidly bolted thereto to afford the outer half of the crank case for the respective cylinders, are removable crank case sections 38, any of which may be removed to afford access to the mechanism.

Figure 1:
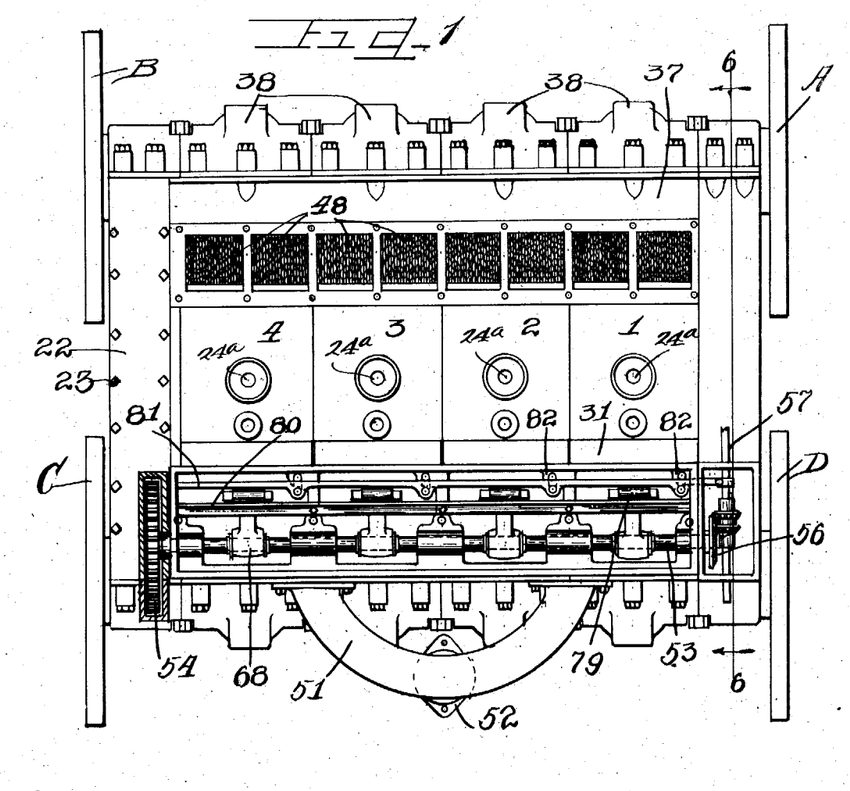
Figure 1 is a top plan view, partly in section and with parts removed, of a device embodying our invention.
Figure 4:
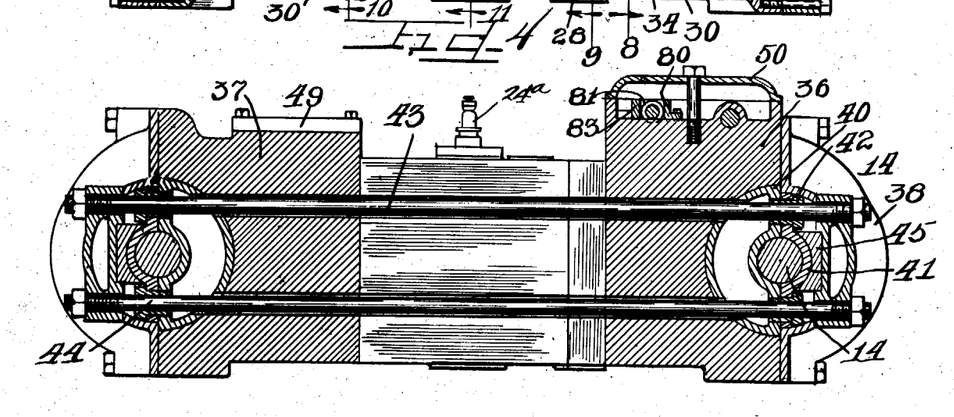
Fig. 4 is an enlarged section on line 4 of Fig. 2.
Figure 5:
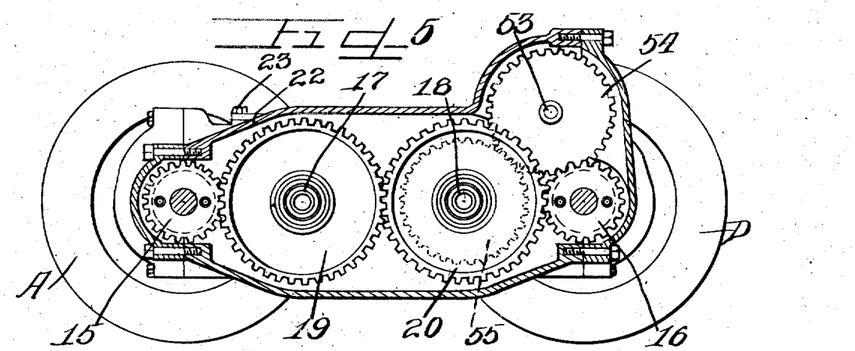
Fig. 5 is a section taken on line 5 of Fig. 2.
Figure 6:
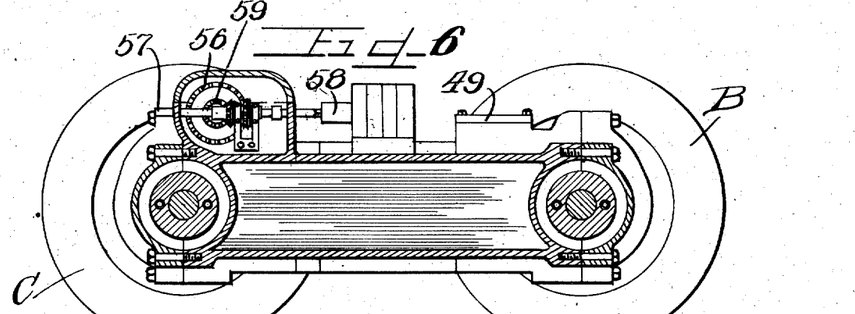
Fig. 6 is a section taken on line 6 of Fig. 1.
Figure 10:
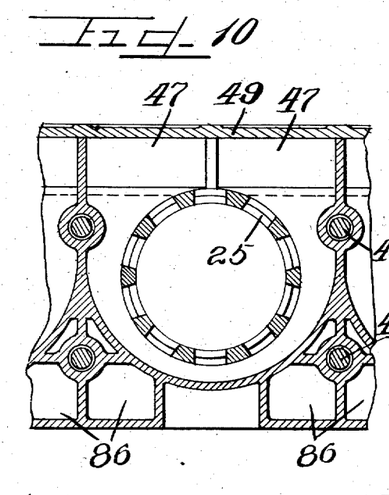
Fig. 10 is an enlarged section taken on line 10 of Fig. 3.
Figures 12, 13:
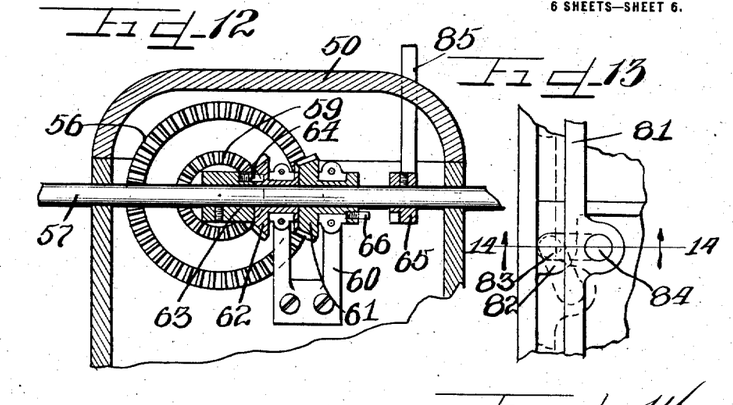
Fig. 12 is an enlarged fragmentary detail of a part of the mechanism for converting from one to the other stroke type.
Fig. 13 is an enlarged fragmentary detail illustrating a part of the valve controlling mechanism.
Figures 14, 15, 16, 17, 18:
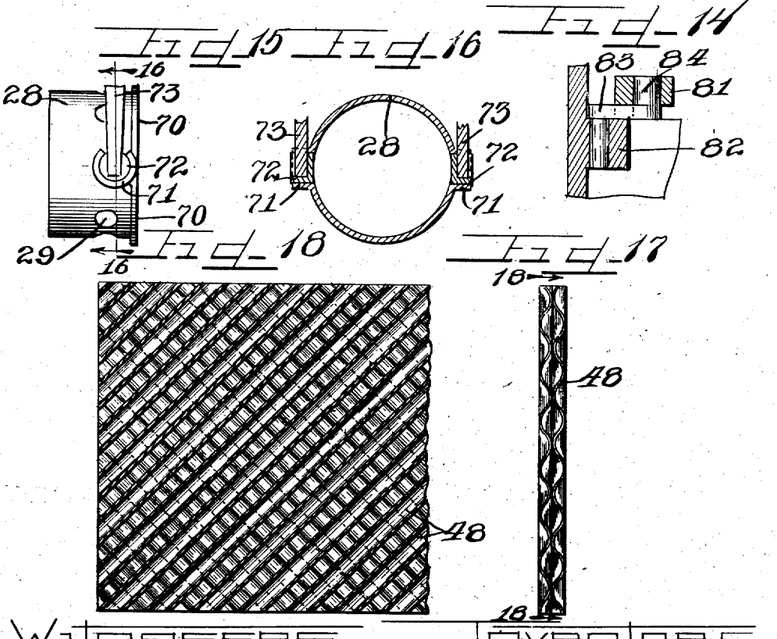
Fig. 14 is a section on line 14 of Fig. 18.
Fig. 15 is a view in side elevation, illustrating the construction and operating means for the converting valve.
Fig. 16 is a section on line 16 of Fig. 15.
Fig. 17 is an enlarged edge view of the mixing device.
Fig. 18 is a section taken on line 18 of Fig. 17.

As shown, the inner crank case section has secured therein one half the bearing or box 40, for said crank shaft, while the other or outer half 41, thereof, is contained within the outer crank case section 38, and may be secured together by means of tubular stud bolts 42, as indicated in Fig. 4, and through which, and extending from end to end of the engine between the cylinders, upper and lower tie bolts 43 and 44 extend. A bearing block 45, is provided for each of said outer bearing members 41, and against which the outer crank case section is drawn by means of said bolts, as shown in Fig. 4, whereby the bearing is always kept tight to the crank shaft. Of course, the construction affords an individual tight crank case for compression at each end of each cylinder and having no communication with the crank case for any other cylinder. At the opposite ends of said cylinders, the inner crank case section 37, is cored to receive the respective ends of said cylinders therein and to afford an annular passage 30, therearound coincident with the inlet ports in said cylinders, and is also cored to afford an upwardly and inwardly directed passage 47, leading from the top of each crank case inwardly and in open communication at all times with the inlet ports 25, to the cylinder, as shown in Figs. 3, 7, and 10. Said passages 47, open through the top of said crank case, as shown more clearly in Fig. 1, and are normally closed with cover plates 49. Secured in said passages are the vaporizing and mixing means comprising, as shown, thin plates 48, of corrugated metal, the corrugations in which extend diagonally of said plates. A group of said plates 48, is secured in each of said passages 47, with the corrugations thereof arranged substantially at right angles with each other, as indicated in Figs. 1, 17 and 18, and the fuel charge when drawn therethrough to the inlet ports 25, is thoroughly mixed, all the hydro-carbon constituents thereof being completely vaporized, thereby enabling the full explosive value thereof to be obtained. Any of the oil in the crank case for splash lubrication carried upwardly with the charge, is also arrested and collected by said plates, and may be delivered downwardly through suitable passages to the adjacent crank shaft bearings. The fuel charge is drawn into an inlet chamber extending for the length of the inner crank case section 36, and on the top thereof, and closed by a removable cover 50, and for this purpose an inlet manifold 51, communicating with a source of hydro-carbon supply near its middle as indicated at 52, is connected at its ends in said inlet chamber, as shown in Figs. 1 and 3. Within said inlet chamber is provided mechanism for operating the exhaust controlling sleeve valve. For this purpose, as shown, a shaft 53, is journaled in said chamber transversely the cylinders and engaged thereon is a gear wheel 54, which is driven by a gear wheel 55, forming an integral or separate part of the gear 20 secured on the stud shaft 18, said gear wheels 54, and 55, being of equal size, and of such size relatively to the pinion 16, as to afford a two to one drive normally. At the opposite end of said shaft 53, is provided a bevel gear 56, and shaft 57, said shaft extending through a gear casing therefor provided at the end of the upper inlet chamber. Said shaft extends slidably through the walls of said gear case, and is angular at its inner end to fit in the angular socket in the armature 58, of a magneto, as shown in Fig. 6. Integral with said bevel gear 56, and concentric therewith, is a smaller bevel gear 59, as shown in Figs. 6 and 12. Journaled upon a bracket 60, supported on the wall of the gear case, is a bevel pinion 61, meshing with the bevel gear 56, and a bevel pinion 62, meshing with a bevel gear 59, and each constantly driven thereby. Inasmuch as the relative sizes of the pinion 16, and gear wheel 54, are such as to afford one revolution of the gear wheel and consequently the shaft 53 for two revolutions of the crank shaft, the pinions 62 and 59 are of equal size to maintain said ratio of operation. The relative sizes of the gear wheel 56, and pinion 61, however, are such as to rotate said pinion 61 twice for each revolution of the bevel gear 56; that is to say, to drive the pinion 61, at a one to one ratio with the crank shaft.

Adjustably (but rigidly) secured on the shaft 57, is a clutch block 63, having a pin 64, therein, adapted to engage in a suitable aperture in the pinion 62, to drive the shaft 57, from said bevel gear 59. A similar clutch block 65, is also secured on said shaft and provided with a recess therein to receive a clutch pin 66, set in the hub of the bevel pinion 61, as shown in Fig. 12, to adapt said shaft to be driven from said pinion 61, when said shaft is shifted longitudinally to engage said pin in said clutch box 65. This construction enables the magneto being driven for either two cycle or four cycle operation, dependent upon which pinion drives said shaft 57.

Mechanisms for actuating the shifting valves 28, to correspond, are contained within the inlet chamber. For this purpose, eccentrics 67, are provided on said shaft 53, one for each cylinder, and suitably adjusted as the timing for the respective cylinders may require for four cycle operation, and the eccentric yoke 68, for each of said eccentrics is provided with an eccentric rod 69. Each of the valve sleeves 28, is provided at its outer end with a peripheral raised flange 70, and on each side of said sleeve with a laterally directed apertured lug 71, in which is secured the bearing member 72, one on each side of said sleeve and to which are rigidly engaged downwardly directed yoke arms 73, which extend upwardly above the sleeve and are connected by means of an integral web or bar 74. Said yokes are provided on the outer side thereof with a boss 75, provided with a wrist pin 76, to which respectively are journaled the ends of the eccentric rod 69. The upper ends of said yoke arms are connected by means of a short shaft 78, on which is provided a roller 79. Rigidly secured in said inlet chamber transversely the engine, is an angle bar 80, against the upwardly directed flange of which the rollers at the upper ends of said yokes bear. A complemental bar 81, is mounted in said inlet chamber to coact with the bar 80, to engage the rollers on said yokes therebetween, as shown in Fig. 1, and is adapted for adjustment to release said rollers from such engagement. For this purpose, lugs 82, are provided on the inner walls of said inlet chamber, and links 83, are pivotally connected therewith and with suitable pivot pins 84, on said bar 81, to permit the same to swing outwardly, as indicated in full lines in Fig. 13, or to permit the retraction thereof, as indicated in dotted lines in said figure, and a lever 85, is provided on the end of said bar to permit such actuation. When adjusted as shown in Fig. 3, said eccentrics reciprocate the valve sleeves to close the exhaust ports in each cylinder at the end of alternate power strokes of the piston in each of said cylinders. When adjusted for normal two stroke operation, however, by the shifting of the magneto drive, as before described, and the swinging of the shifting bar 81, forwardly to release the yoke, said valve sleeve is first retracted by the engagement of the roller 79, against the fixed bar 80, and thereafter said valve sleeve remains stationary, and the upper end of said yoke reciprocates, being free to do so by the release of the shifting bar 81, therefrom.

As shown, the crank cases are at all times in communication through passages 86, extending therebetween and communicating through the crank case sections, the exhaust casing, and the cylinder water jacket, as shown more plainly in Figs. 7 to 11 inclusive.

The operation is as follows: When operated as a two cycle or two stroke engine, the shifting bar or rod 81, is moved forwardly by means of its lever out of engagement with the roller 79, on the yoke, and the magneto shaft 57, is shifted outwardly to bring the clutch block 65, into engagement on the hub pinion 59, thus changing the timing of the magneto to afford an explosion in each cylinder at each revolution of the crank shaft. When the engine is operated as a two cycle engine, the sleeve valve 28, is retracted from the position shown in Fig. 3, and remains at rest, and the charge is drawn into the inlet chamber, thence when the pistons move inwardly to compress the previously admitted charge, the charge is drawn into the crank case through ports 27 by the partial vacuum produced by the movement of the pistons, and the return stroke of the piston causes compression of the charge in both crank cases of each cylinder to the end of the power stroke to afford the primary compression. Near the end of the power stroke, the exhaust ports 26, are uncovered by one piston and following the exhaust of the spent products of combustion therethrough immediately thereafter the inlet ports 25, are opened by the movement of the other piston. The opening of the ports 25, admits a fresh charge therethrough from the crank cases, which communicate through said passages 86, as before described, and which, owing to said primary compression, fill the cylinder with a charge under considerable pressure. The return of the pistons to firing position compresses the charge, admits another charge through the ports 27 to the crank cases, and the cycle is thus repeated. In the construction wherein four such cylinders are shown, said cylinders may be timed in various ways, a convenient arrangement being indicated in Fig. 2, wherein the cylinders 1 and 4, are both at exhaust and intake position, and the cylinders 2 and 3, are both at compression and firing position, so that at normal two stroke operation with the cranks in each shaft arranged at 180° apart, two power impulses occur simultaneously at each half revolution of the crank shaft.

When adjusted for four cycle operation, the shifting bar 81, is returned to the position shown in Figs. 3 and 13, to bring the valve sleeve 28 into operation. This is accomplished by actuating the lever 85, and simultaneously pushing the magneto shaft 57, inwardly to drive said shaft through the pinions 62 and 63. The shaft 53, rotates once for each two revolutions of the crank shafts, and the eccentrics 67 are so set upon the shaft 53 for the respective cylinders as to retract the valve sleeves to open the exhaust ports 26, at the end of a power stroke for each cylinder. It follows that following the exhaust through the ports 26, the valve sleeves having been previously retracted and the inlet taking place simultaneously through the ports 25, the charge is given its first compression between said pistons, and a second charge is drawn into the crank-cases at the end of the first compression stroke through the ports 27, and is compressed therein by the next outward stroke of the pistons. The timing of the magneto having been changed, however, no ignition occurs and the previously compressed charge is held within the cylinders owing to the sleeve having been projected forwardly by its eccentric, as shown in Fig. 3, to close the exhaust ports. A portion of the second charge within the crank cases and under primary compression, now flows into the cylinders, through the ports 25, increasing the amount of mixture therein approximately fifty per-cent. over that admitted under two cycle operation and immediately thereafter, the exhaust ports 26, and inlet ports 25 are covered by the pistons on the final compression stroke, the valve sleeve retracted, and at the end of such second compression stroke, ignition occurs, driving the pistons outwardly on the power stroke, and exhausting through the then fully open exhaust ports 26, the cycle being thus repeated indefinitely.

Figure 2:
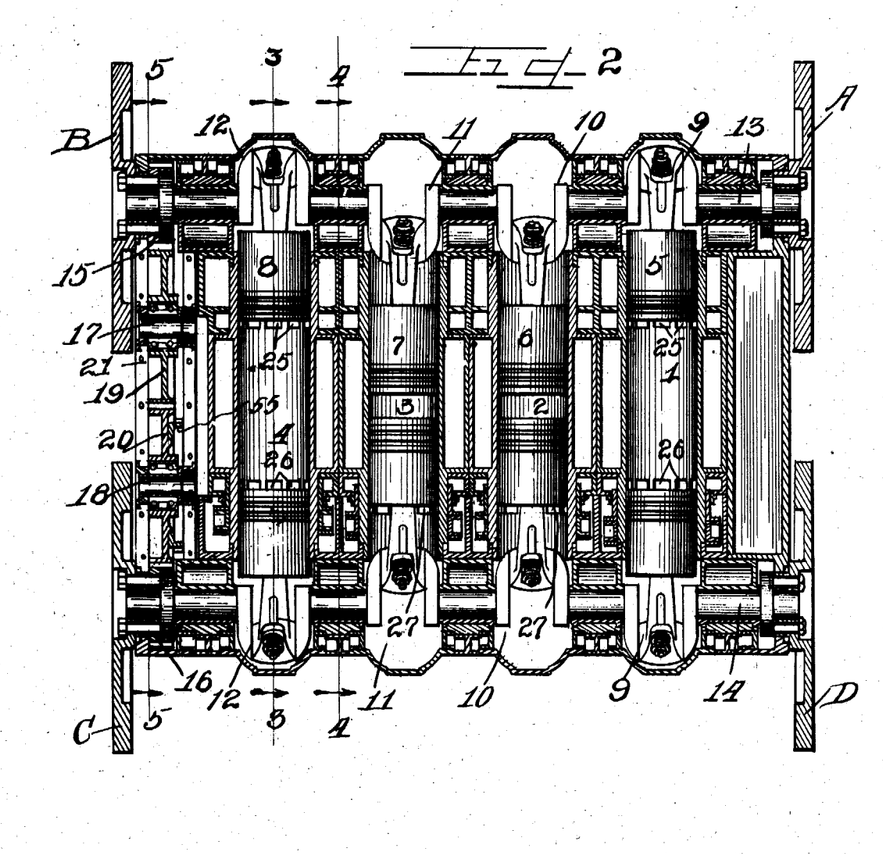
Fig. 2 is a horizontal section thereof.

The operation illustrated in Fig. 2, in which the cylinder 1, is at exhaust and first intake position, the pistons in the cylinder 3, are at their first compression position, the pistons in the cylinder 4, are at second intake position, as indicated also in Fig. 3, while the pistons in the cylinder 2, are at their final compression and firing position.

The operation is subject to change from two stroke to four stroke ignition instantaneously by shifting the drive on the magneto shaft and appropriately actuating the shifting rod or bar.

From the construction described, it is evident that a standardized construction throughout may easily be effected to permit said engines to be made of any desired number of cylinders, and to permit of the removal of any defective or broken part and the substitution of a stock part therefor. We have shown in connection with our present engine, improved connecting rods equipped with means for automatically adjusting the piston pin and bearings thereof to maintain the same sufficiently tight. We have, however, not described said construction as it forms no part of the present invention, and is the subject of another application for patent for connecting rods filed September 6, 1912, Serial No. 718,810.

Of course, it is to be understood that we have shown but a preferred form of our invention, and that numerous details of construction and operation may be varied and we therefore do not purpose limiting the patent granted on this application, otherwise than necessitated by the prior art.

We claim as our invention:

1. An engine of the class described embracing a plurality of cylinders open at each end, crank cases connecting like ends of said cylinders, a crank shaft journaled in the crank cases at each end of each cylinder, oppositely movable coacting pistons in each cylinder and connected respectively with said crank shafts, centrally disposed ignition means connected in said cylinders, means admitting an explosive charge to the crank cases for primary compression, ports at one end of each cylinder for admitting the charge between the pistons at the end of a power stroke, exhaust ports at the other end of each piston for exhausting the products of combustion at the end of the power stroke, an exhaust valve, mechanism holding the same normally inert for two cycle operation and mechanism actuating the same for closing the exhaust ports at alternate outward strokes of the piston to hold a previously compressed charge while delivering an additional charge of mixture into the cylinders, and means shifting the timing means for four stroke operation.

2. An engine of the class described embracing parallel open ended cylinders, a crank case at each end thereof, crank shafts therein, oppositely reciprocating pistons in said cylinders connected to drive said crank shafts, inlet and exhaust ports, an igniting mechanism adjustable to two stroke and four stroke operation, mechanically actuated valves acting to close the exhaust ports at alternate outward movements of the pistons, and means to adjust the valves to prevent exhaust of the fuel charge from said cylinders preliminary to the admission of an additional charge into said cylinders.

3. In a device of the class described a central firing internal combustion engine, normally of the two stroke type, pistons therein, an exhaust sleeve valve inert at two stroke operation, and shifting and timing mechanism adapted to afford ignition at alternate compression strokes of the piston and adapted to actuate said valve to close the exhaust ports at all outward movements of the pistons except at the end of the power stroke.

4. In an engine of the class described a cylinder open at each end, a pair of pistons movable therein, inlet ports at one end of said cylinder controlled by movement of one of said pistons to permit intake of fuel therethrough, crank cases mounted on each end of said cylinder and communicating with one another adapted to receive the fuel passing inwardly through said inlet ports, inlet ports at the other end of said cylinder adapted to permit a flow of fuel from said crank cases into said cylinder between said pistons for firing, exhaust ports in said cylinder controlled by movement of one of said pistons to permit eduction of the products of combustion, and a sleeve valve operated synchronously with said pistons to open and close said exhaust ports independently of the piston controlling the same.

5. In a device of the class described a plurality of cylinders, pistons movable therein, a pair of crank shafts journaled at opposite ends of said cylinders and each connected to certain of the pistons therein, ignition means in said cylinders, inlet ports in said cylinders at only one end thereof, exhaust valves controlling the flow from said cylinders at one end thereof, mechanism for changing the timing of the ignition and said exhaust valves whereby said engine may be operated either on a two stroke cycle or a four stroke cycle, mechanism for connecting said crank shafts for synchronous movement thereof, and power take off means on each end of each of said crank shafts whereby the power of said engine may be taken from any one of said means independently of or simultaneously with the others.

6. In a device of the class described the combination with an engine adapted to operate both on a two stroke cycle and a four stroke cycle, of a plurality of cylinders, each cylinder having a pair of pistons movable therein, ports in each of said cylinders controlled by movement of said pistons to permit inlet and exhaust of gases, and a sleeve valve mounted at one end of each of said cylinders adapted to be operated synchronously with said pistons to maintain said exhaust ports closed at predetermined intervals for four stroke cycle operation of the engine.

7. In an engine of the class described a cylinder open at each end, a pair of pistons mounted in said cylinder, a crank shaft driven by each thereto, connections between said crank shafts for synchronous operation of said pistons, inlet ports at one end of the cylinder controlled by movement of one of said pistons to permit inlet of fuel behind one of said pistons for preliminary compression, inlet ports at the other end of said cylinder controlled by movement of the other of said pistons to permit a flow of said preliminarily compressed fuel into the cylinder for firing, exhaust ports at the first mentioned end of said cylinder controlled by movement of said first mentioned piston to permit eduction of the products of combustion, ignition means mounted in said cylinder to fire the fuel compressed therein between said respective pistons, means adapted to be thrown into gear with said crank shafts to close said exhaust ports at predetermined intervals, and mechanism for changing the timing of said ignition means whereby when said exhaust port controlling means is thrown into gear the engine may be operated on a four stroke cycle.

8. In a device of the class described a plurality of cylinders, crank shafts journaled at each end thereof, connections between said crank shafts insuring synchronous operation thereof, pistons in said cylinders adapted to drive said crank shafts, inlet and exhaust ports communicating with said cylinders, sleeve valves adapted to control the opening and closing of said exhaust ports, ignition means in each of said cylinders, mechanism for simultaneously changing the timing of the ignition means and the sleeve valves for the exhaust ports whereby said engine may be operated on a two stroke or a four stroke cycle, crank cases for each of said cylinders, and communication between the respective crank cases on opposite ends of each cylinder.

In testimony whereof we have hereunto subscribed our names in the presence of two subscribing witnesses.

ALBERT E. COOK.
THOMAS VAN TUYL.

Witnesses:
ANNA B. HILLS,
CHARLES W. HILLS, Jr.